United States Patent [19]

Gelardi et al.

[11] 4,452,404
[45] Jun. 5, 1984

[54] TAPE REEL HUB ASSEMBLY

[75] Inventors: Anthony L. Gelardi, Cape Porpoise; Gerald W. Nuppula, Hollis Center; James Phillippe, Sanford, all of Me.

[73] Assignee: Shape Inc., Biddeford, Me.

[21] Appl. No.: 409,839

[22] Filed: Aug. 20, 1982

[51] Int. Cl.$^3$ ............................................. B65H 75/14
[52] U.S. Cl. .................................................. 242/71.8
[58] Field of Search .................. 242/71.8, 71.9, 118.4, 242/118.6, 118.61; 206/403, 404, 405, 493

[56] References Cited

U.S. PATENT DOCUMENTS

| | | | |
|---|---|---|---|
| 3,807,654 | 4/1979 | Hall | 242/199 |
| 3,869,099 | 3/1975 | Inaga | 242/199 |
| 4,226,381 | 10/1980 | Katata | 242/71.8 |
| 4,234,137 | 11/1980 | Watnabe | 242/71.8 |
| 4,235,395 | 11/1980 | Wardenaar | 242/199 |
| 4,262,856 | 4/1981 | Nakagawa | 242/71.8 |
| 4,289,282 | 9/1981 | Kohno | 242/71.8 |

FOREIGN PATENT DOCUMENTS 2852413  6/1979  Fed. Rep. of Germany ..... 242/71.8

Primary Examiner—Stuart S. Levy
Assistant Examiner—Lloyd D. Doigan
Attorney, Agent, or Firm—Staas & Halsey

[57] ABSTRACT

A video tape cassette reel having an economically and simply made pivot button member formed independently of the discs and the hub making up the tape reel. The pivot button member is made of a material which resists abrasion, e.g., polyacetal, whereas the hub portion and the flat discs or reels are made of a less expensive plastic. In one embodiment, the pivot button member has a base with a pivot button thereon and three substantially flat legs extending radially from the base. The legs are inserted through a central opening in the upper reel disc and the pivot button member is twisted about 60 degrees so that the legs are lodged under the upper disc and the pivot button member becomes secured in place. In another embodiment, the pivot button member has a substantially flat base with a pivot button thereon. This button member locks the hub and the upper and lower reel discs together by providing three lipped-posts on the hub, placing the lipped-posts through three corresponding openings in the upper disc so that the upper disc rests on the hub, and finally, placing the pivot button member between the posts and twisting the button member, such that the upper surface of the pivot button member base is secured below the lips of the posts and the bottom surface of the pivot button then rests on the upper disc.

20 Claims, 10 Drawing Figures

FIG. 1.
(PRIOR ART)
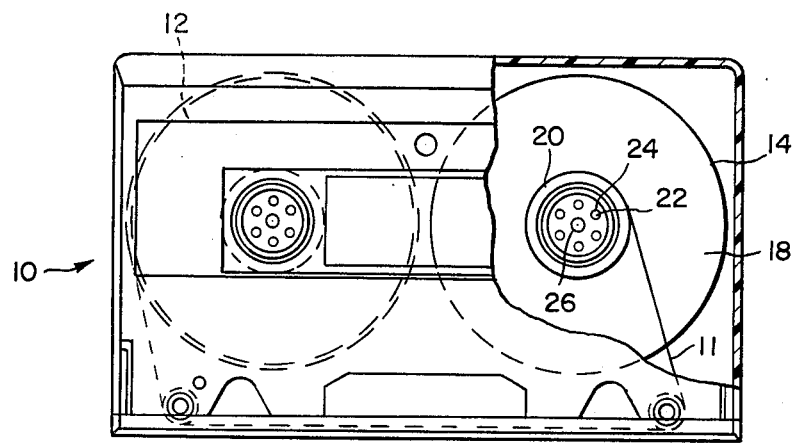
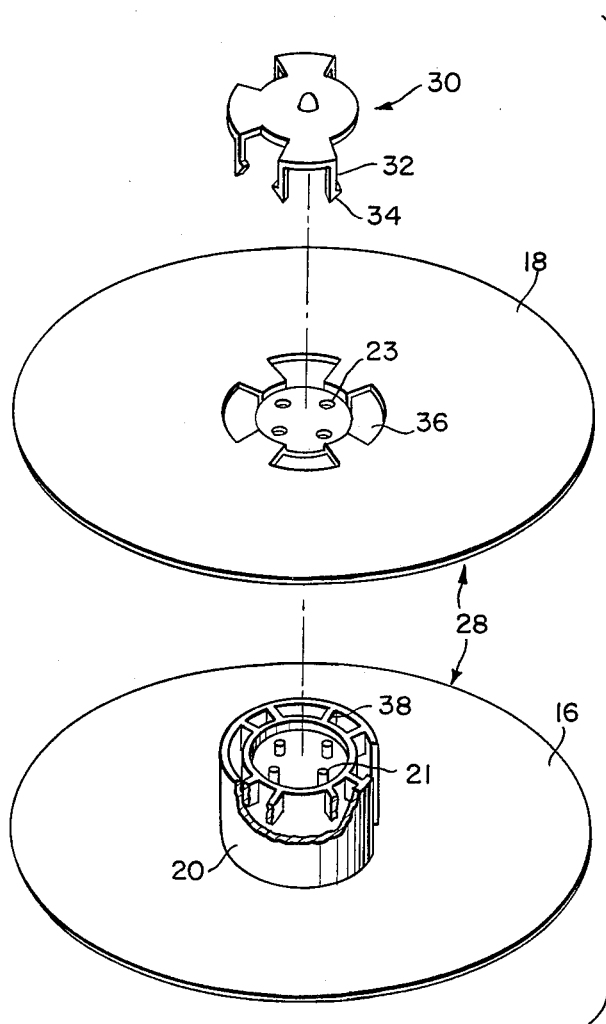
FIG. 2.
(PRIOR ART)
FIG. 3.
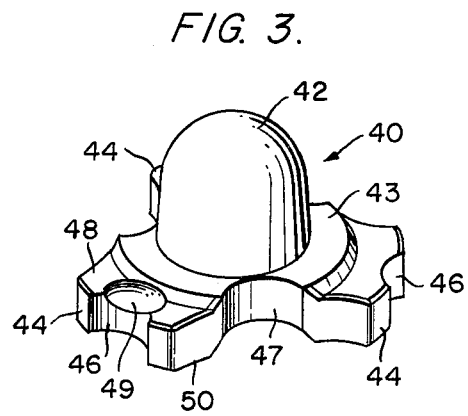

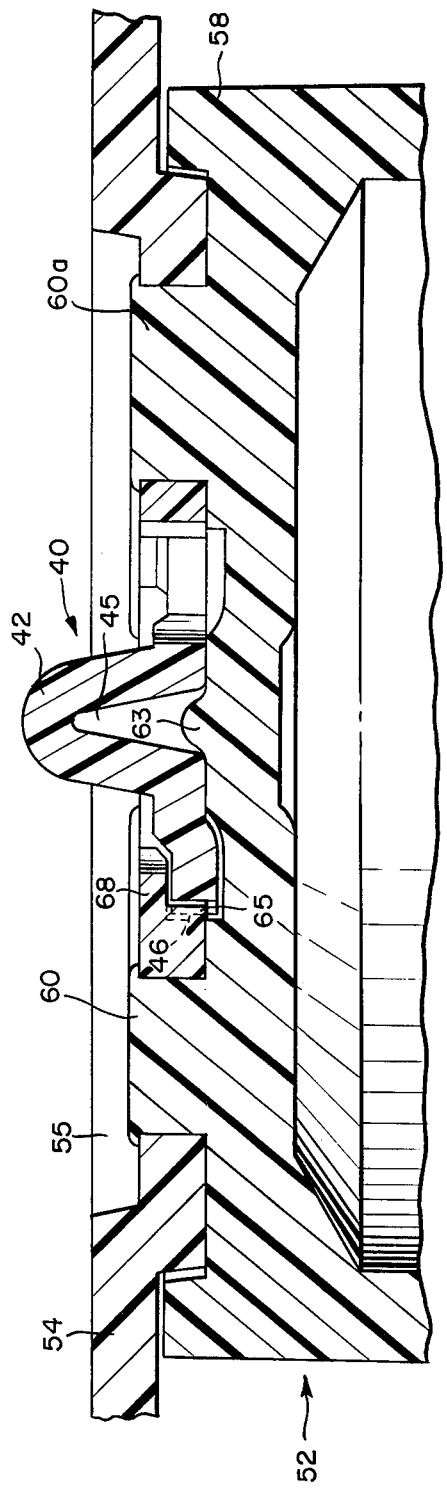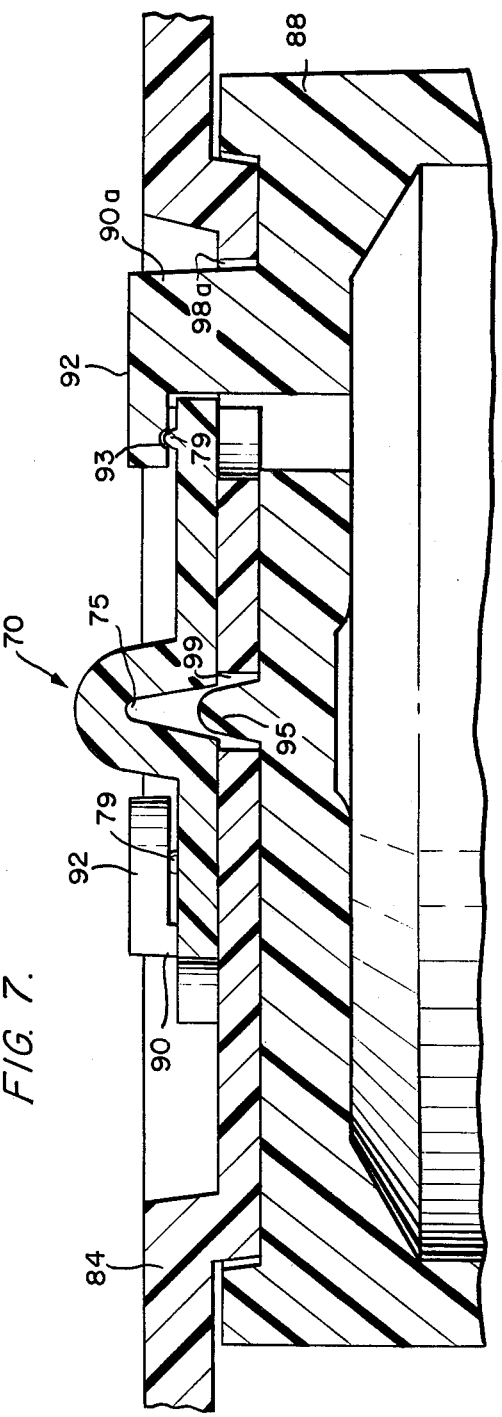

TAPE REEL HUB ASSEMBLY

BACKGROUND OF THE INVENTION

1. Field of the Invention

This invention relates to a tape reel for use in a tape cassette assembly, and more particularly, to an improved hub pivot button for facilitating tape reel rotation.

2. Description of the Prior Art

Tape reels have traditionally comprised a cylindrical hub with an upper flat disc and a lower flat disc attached thereto. Tape reels further generally employ a small, round-topped, conical protuberance or "pivot button" at the top center of the hub for allowing the tape reel to pivot or rotate under a resilient rebound piece extending from the cassette housing top. While the tape is in motion, the pivot button is in a state of friction contact with the resilient rebound piece. Because of this inevitable friction, the pivot button is required to be made of a material which excels in rigidity and resistance to abrasion. The best material known from which to make the pivot button is polyacetal. Although polyacetal excels in wear resistance, rigidity and dimensional accuracy characteristics, it is very expensive.

In spite of the high cost, some tape reels in the prior art have found it necessary to use this expensive material not only for the pivot button, but also in the hub area which does not particularly require the above-stated excellent characteristics of polyacetal. This excessive use is due to particular manufacturing considerations which dictate that the major factors in reducing the cost of tape reel manufacture lie in the reduction of the number of component parts used and the number of work steps involved in tape reel production and assembly.

An example of such an excessive use of polyacetal in tape reels is found in U.S. Pat. No. 4,262,856, issued to Nakagawa. Nakagawa discloses the use of a pivot button formed integrally of the hub, wherein the hub is welded to an upper disc to fixedly engage the upper disc to the hub. Similarly, U.S. Pat. No. 4,235,395, issued to Wardenaar et al., illustrates the use of tape reels wherein the upper disc is welded to the hub and the pivot button is formed integrally with the hub.

Several other patents have disclosed hubs having the pivot button formed integrally thereof, but the hub is engaged with the upper disc by means other than welding. For example, in U.S. Pat. No. 4,289,282, issued to Kohno, engaging means for locking the upper reel to the hub are disclosed, including protrusions positioned on the hub which extend toward and fit into the upper disc. The upper disc is placed over these protrusions and rotated a certain degree to engage the protrusions within elongated holes found in the upper disc. Stepped portions located on the inside of the upper disc are also disclosed which twist under corresponding hub flanges to lock the upper reel to the hub.

U.S. Pat. No. 4,226,381, issued to Katata, is similar to Kohno, supra, in that it illustrates various hooked engaging means to eliminate the welding step in manufacturing the tape reels. Again, however, the pivot button is formed integrally of the hub. The engaging means used in Katata have claw-like heads which are flexed and inserted into the holes formed in the upper disc to fix the upper disc to the hub/lower disc piece. The engaging means may eminate either from the hub upwardly through the upper disc, or from the upper disc downwardly into the hub. Of course, with both Katata and Kohno, supra, the entire hub is made of polyacetal, and thus, manufacturing is expensive.

Finally, U.S. Pat. No. 4,234,137, issued to Watanabe et al. discloses a separate pivot button "carrier" which is inserted into the tape reel to engage centrally the hub. This tape reel uses pins on the hub and openings on the upper disc for alignment of the upper disc, but the pins are not welded after insertion. The pivot button carrier has specifically designed legs for hooked engagement into the hub. The legs are generally angled appendages which have hooks on the ends thereof and which extend perpendicularly from the pivot button carrier. These individual legs are inserted through openings in the upper disc and then locked into specially designed openings in the hub.

While the Watanabe et al. patent discloses a means for separately manufacturing a polyacetal pivot button carrier to be inserted into a hub, the design still inefficiently uses an excess of the expensive polyacetal and increases the cost of manufacturing by requiring time consuming fabrication and interlocking of the rather elaborate openings, legs and hooks.

In addition, once the Watanabe et al. pivot button carrier is "locked" into the hub, it cannot be thereafter removed without damage. Thus, in the case of a molding imperfection in one of the tape reel parts being detected after insertion, the entire tape reel must be discarded.

From the foregoing, it can be seen that an improved hub assembly is desired which could further limit the amount of polyacetal to the immediate area of the pivot button, and which could be simpler in structure such that it may be made in a less costly way, may be more easily inserted into the tape reel through automation, and may be removed after assembly into the tape reel if necessary.

SUMMARY OF THE INVENTION

An object of the present invention is to provide a tape reel for a tape cassette which utilizes expensive polyacetal only where necessary, i.e., at the pivot button and its immediate area, consequently lowering the cost of production.

Another object of this invention is to provide a relatively simple pivot button member not depending upon the rather complicated hook engaging means known in the art, but instead using substantially flat extensions contributing to low cost molding of the pivot button member and efficient automation of the pivot button member into the tape reel.

Another object of this invention is to provide an alternate pivot button member which can be molded at low cost and which is capable of efficient automated insertion into the tape reel to lock the hub/lower disc to the upper disc, thus avoiding the need for welds and reducing overall manufacturing steps and costs for assembling the tape reel.

Finally, it is an object of the present invention to provide a pivot button member which allows for removal of the pivot button member after insertion into the tape reel for the purpose of, for example, correcting molding imperfections.

Additional objects and advantages of the invention will be set forth in part in the description which follows, and, in part will be obvious from the description, or may be learned by practice of the invention. The objects and advantages of the invention may be realized and obtained by means of the instrumentalities and combinations particularly pointed out in the appended claims.

To attain the objects described above according to the present invention, in a preferred embodiment of the tape reel hub assembly there is provided a lower disc attached to a first end of a hub and an upper disc welded to the second end of the hub. A separate pivot button member is made of polyacetal, and the hub portion and the upper and lower discs are made of a less expensive plastic. The pivot button member has three substantially flat legs which are placed through an opening in the upper disc and twisted 60 degrees so that the three legs are lodged under three corresponding upper disc flanges and the pivot button member becomes secured in place. In an alternate embodiment of the pivot button member of the present invention, the pivot button member locks the hub, and the upper and lower discs together without welds. The locking is accomplished by providing three posts on the hub at an equal distance from its center and extending upwardly. Each post terminates in a lip and the posts are inserted through three corresponding openings located in the upper disc so that the upper disc rests on the hub. Finally, the pivot button member having three recesses is placed between the three lipped-posts on the upper disc and twisted, such that small ramps on the upper surface of the pivot button member are secured in recesses located on the lower surface of the lips of the posts. The lower surface of the pivot button member rests against the upper disc and, thus, the pivot button member locks the upper disc between the hub and the pivot button member.

This tape reel design, in comparison with the prior art discussed above, further minimizes the amount of polyacetal used to manufacture the pivot button member, decreases the cost and time of manufacturing required to produce the engaging means of the pivot button member, requires only a simple form of insertion to improve the efficiency of assembly automation, and allows for removal of the pivot button member after insertion to correct for molding imperfections.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top view of a prior art video tape cassette having placed therein two tape reels and illustrating particularly the weld lugs at the top of each hub;

FIG. 2 is an exploded perspective view of a prior art video tape cassette reel;

FIG. 3 is a perspective view of a first preferred embodiment of the pivot button member according to the present invention;

FIG. 6 is a cross-section of the preferred embodiment of the pivot button tape real assembly according to the present invention employing the button member shown in FIG. 3;

FIG. 7 is a cross-section of another preferred embodiment of the pivot button tape reel assembly according to the present invention employing the button member shown in FIG. 8;

DESCRIPTION OF THE PREFERRED EMBODIMENTS

Figure 4:
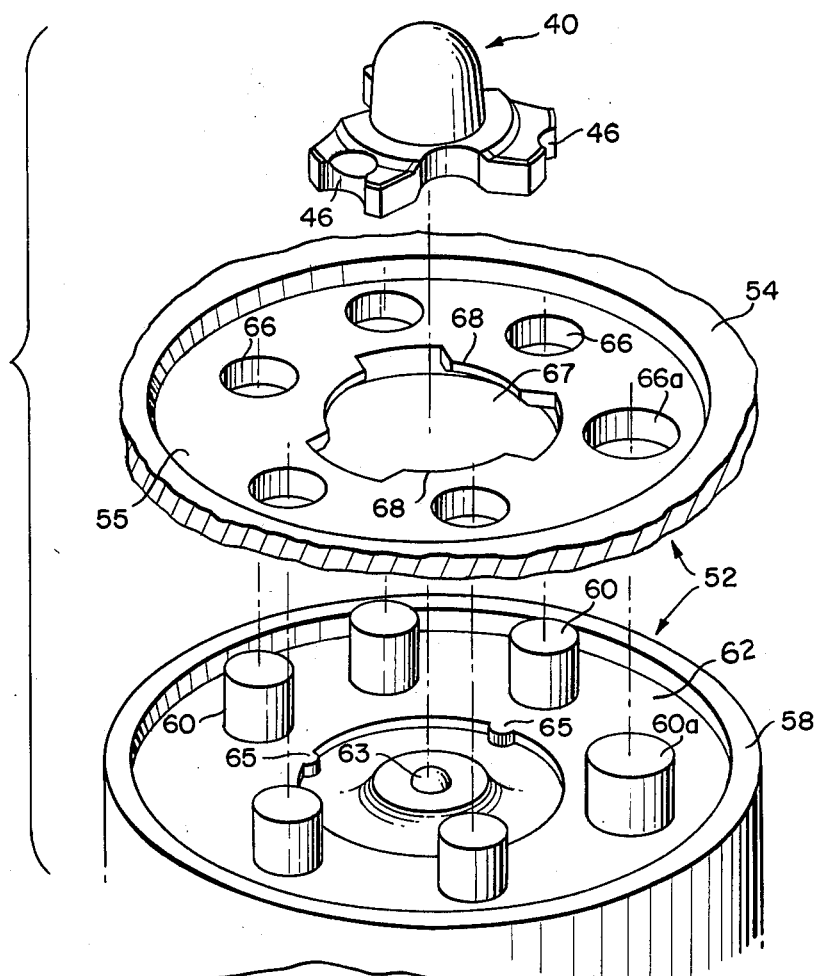
FIG. 4 is an exploded view of the preferred embodiment of the pivot button tape reel assembly according to the present invention employing the button member shown in FIG. 3.

As seen in FIG. 1, the conventional video cassette 10 for running magnetic tape 11 therethrough, includes a first and second tape reel 12 and 14, respectively. Each tape reel 12 and 14 is identical and comprises a lower disc 16 (see FIG. 2), an upper disc 18 and a hub 20 which is connected centrally between the lower disc 16 and the upper disc 18. The upper disc 18 particularly, is usually connected to the hub by weld lugs 22 which pass through holes 24 found in the upper disc 18.

The hub 20 usually has formed integrally and centrally of its top surface a pivot button 26. Because the pivot button 26 must be made of a low friction material as described previously, such as polyacetal, the entire conventional hub 20 is usually also made of polyacetal.

As shown in FIG. 2, another prior art tape reel 28 also has an upper disc 18, a lower disc 16 and a hub 20 placed therebetween. The hub 20 has located thereon four pins 21 for insertion into four corresponding openings 23 in the upper disc 18. This particular tape reel 28 is capable of replacing either reels 12 or 14 in the video cassette 10 shown in FIG. 1. However, instead of forming the pivot button 26 integrally of the hub 20, tape reel 28 provides a separate pivot button carrier 30 which is inserted through the upper disc 18 to engage the hub 20. Special angled legs 32, terminating in hooks 34, extend perpendicularly from the pivot button carrier 30 and are inserted through corresponding openings 36 in the upper disc 18 and then locked under special flanges 38 within the hub 20. Thus, in this prior art design, the upper disc 18 is locked between the pivot button carrier 30 and the hub 20 when the legs 32 of the carrier 30 pass through the upper disc 18 and lockingly engage the hub 20.

Another means of manufacturing tape reel 28 is to manufacture the lower disc and the upper disc as one piece. In such a configuration the prior art tape reel may comprise at least three component parts, i.e., the pivot button carrier, the upper disc and the lower disc incorporating the hub.

FIG. 3 illustrates a first preferred embodiment of the pivot button member 40 of the present invention. The pivot button member 40 comprises a pivot button 42 formed centrally and integrally on a base 43. The base and button form a hollow button member with a recess 45 centrally located on the underside thereof (see FIG. 6) for reasons described hereafter. In addition, there are three substantially flat legs 44 which extend radially from the base 43. At the ends of each leg 44 there is cut therefrom semicircular recesses 46. These recesses 46 are intended to receive complimentary projections formed in the hub, which projections will be described later. In addition, between each leg 44 there is also cut semicircular recesses 47 which further aid in reducing the amount of polyacetal used and aid in the manipulation of the pivot button member 40 during automation or hand assembly when the machine or person holds the pivot button member 40 at these recesses 47 by using, e.g., a pronged tool.

Each leg 44 also has an upper surface 48 and a lower surface 50. There can be seen in FIG. 3 an indentation 49 at the upper end of one of the legs 44. This indentation 49 is merely the point at which the plastic is injected into the pivot button mold.

Figure 5:
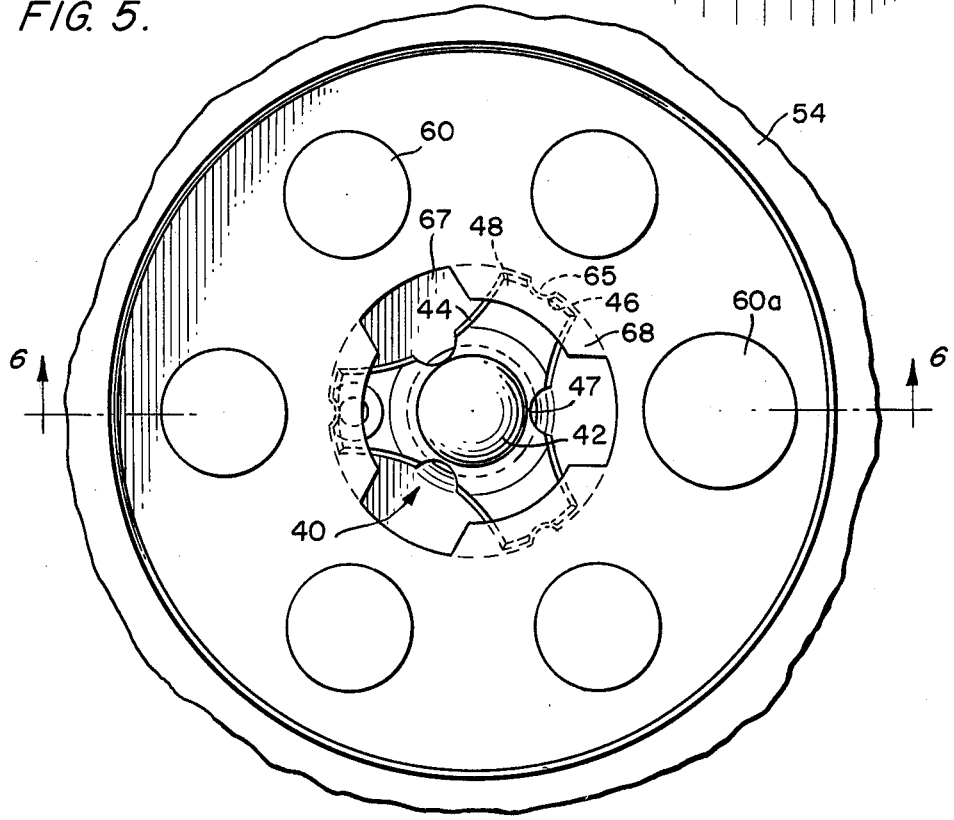
FIG. 5 is a top view of the preferred embodiment of the pivot button tape reel assembly according to the present invention employing the button member shown in FIG. 3.

FIGS. 4, 5 and 6 illustrate a pivot button tape reel assembly according to the present invention employing the pivot button member 40 shown in FIG. 3 in a tape reel 52. The tape reel 52 comprises an upper disc 54, a lower disc 56 (not shown) and a hub 58. Alternatively, the hub 58 and lower disc 56 may be molded as one hub/disc piece as previously described.

The hub 58 has located radially thereon a plurality of weld lugs 60. Preferably, there are six weld lugs 60 with one weld lug 60a being made larger than the other five. The reason for this difference is that the larger weld lug fits a correspondingly larger weld lug opening 66a in the upper disc 54, which disc openings 66 will be explained later. Together, the large weld lug 60a and the corresponding opening 66a ensure that the upper disc 54 is oriented properly upon the hub 58. The upper disc 54 must be aligned so that windows (not shown) provided on the upper disc 54 near the hub 58 correspond with certain holes in the hub (not shown), such that a tape lock, known in the art, may be inserted through the window in the upper disc 54 and into one of the hub holes to hold the end of the tape in place in the hub.

The hub 58 also has located therein a central depressed area 62 for receiving the pivot button member 40 and a corresponding projecting area in the upper disc, which will be described later, a small rounded, conical projection 63 located centerally of the hub 58 for receiving the recess 45 located centrally on the underside of the pivot button member 40 (see FIG. 6), and three small, semicircular projections 65 for receiving the recesses 46 formed on the outside of each leg 44.

The upper disc 54 has a depressed area 55, i.e., a projecting portion of the disc 54 that fits into area 62 of the hub 58, and a plurality of openings 66 for correspondingly receiving the weld lugs 60 of the hub 58. In addition, the upper disc 54 comprises a central opening 67 for receiving the pivot button member 40 therethrough. The opening 67 is bordered by several flanges 68, extending inwardly of the upper disc 54.

As can be seen from FIGS. 4–6, to assemble the pivot button member 40 into the tape reel 52 according to the preferred embodiment of the invention, the lower disc 56 (not shown) is first secured to the hub 58 and the weld lugs 60 are inserted through the corresponding openings 66 in the upper disc 54. The weld lugs 60 are then heat-treated to weld the upper disc 54 to the hub 58. Then, the substantially flat legs 44 of the pivot button member 40 are inserted through the opening 67 in such a way that the pivot button member 40 enters the recess 62 of the hub 58 until the recess 45 rests on the projection 63, the lower surfaces 50 of the legs 44 abut the hub 58, and the plane of the upper surfaces 48 of the legs 44 is below the plane of the flanges 68. At this point the pivot button member 40 is twisted about 60 degrees so that the upper surface 48 of each substantially flat leg 44 rests under one of the corresponding flanges 68. The pivot button member will twist freely until recesses 46 located on the ends of legs 44 engage the corresponding projections 65 located on the hub. The pivot button member 40 is now securely in place.

Figure 8:
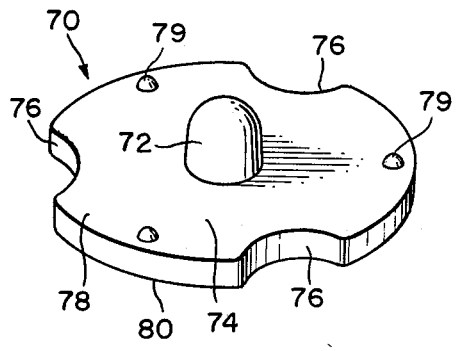
FIG. 8 is a perspective view of another preferred embodiment of the pivot button member according to the present invention.

FIG. 8 illustrates another preferred embodiment of the pivot button member of the present invention. As shown in FIG. 8, there is a pivot button member 70 having a pivot button 72 similarly formed integrally and centrally on a base 74. The base 74, however, is a broad flat base having several recesses 76 formed at the outer edge thereof. The base 74 also has an upper surface 78 and a lower surface 80, with several small ramps or semi-spherical nodules 79 located radially on upper surface 78 that are intended to engage corresponding recesses found at the hub 88, as will be described later. The base and button form a hollow button member with a recess 75 centrally located on the underside thereof (see FIG. 7) for reasons described hereafter.

Figure 9:
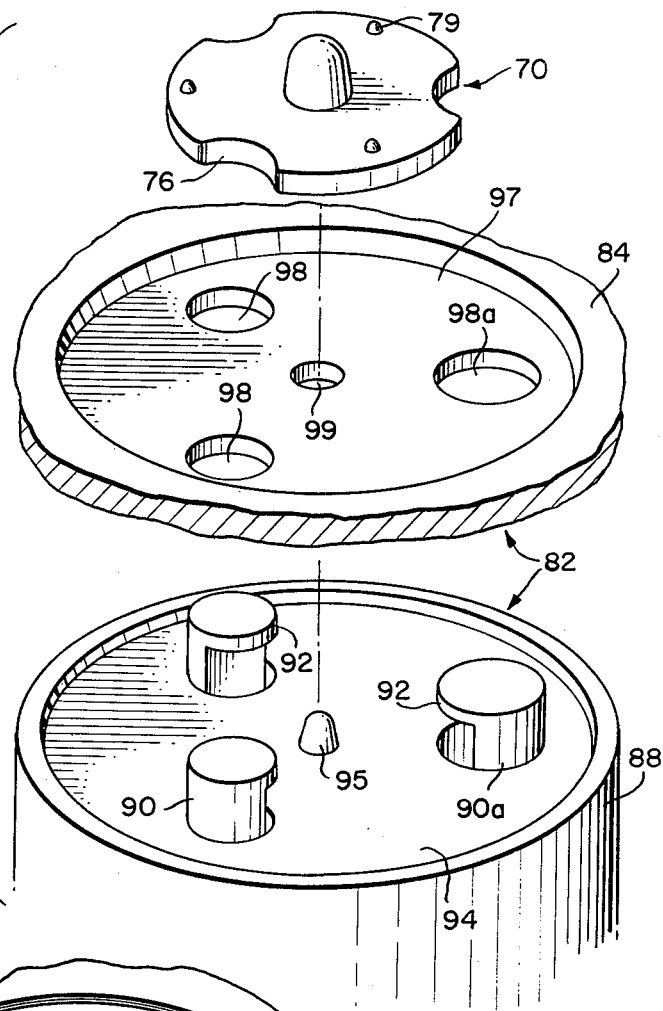
FIG. 9 is an exploded view of the preferred embodiment of the pivot button tape reel assembly according to the present invention employing the button member shown in FIG. 8.
Figure 10:
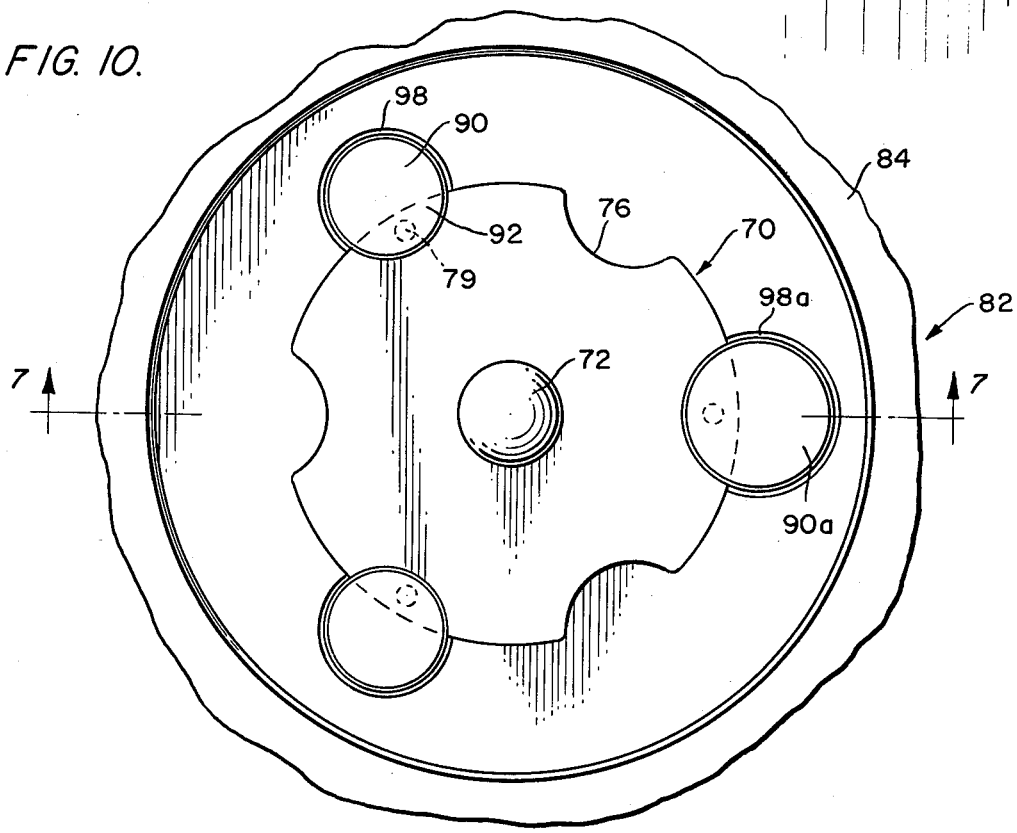
FIG. 10 is a top view of the preferred embodiment of the pivot button tape reel assembly according to the present invention employing the button member shown in FIG. 8.

FIGS. 7, 9 and 10 illustrate a pivot button tape reel assembly according to the present invention employing the pivot button member 70 shown in FIG. 8 in a tape reel 82. Tape reel 82 comprises an upper disc 84, a lower disc 86 (not shown) and a hub 88. The hub 88 has located thereon several posts 90, each terminating at their outer end in a lip 92.

Preferably, there are three posts 90, with one of these posts 90a being made larger than the other two posts. The reason for this difference, as similarly stated in regards to the first preferred embodiment, is that the larger post fits a correspondingly larger opening 98a in the upper disc 84, which openings 98 will be described later. Together, the large post 90a and the corresponding opening 98a ensure that the upper disc 84 is oriented properly on the hub 88. The upper disc 84 must be aligned so that windows (not shown) provided on the upper disc 84 near the hub 88 correspond with certain holes in the hub (not shown), such that a tape lock, known in the art, may be inserted through the window in the upper disc 84 and into one of the hub holes to hold the end of the tape in place in the hub.

Each lip 92 possesses on its underside a recess 93 (see FIG. 7) which corresponds in shape to the semi-spherical nodules 79 on the button base 74 as described above. The recesses 93 are intended to receive and engage the nodules 79. Of course, although the preferred embodiment discloses the nodules 79 being located on the pivot button member 70 and the recesses 93 being located on the underside of the lips 92, an equivalent structure locates the recesses on the pivot button member 70 and locates the nodules on the lips 92.

The hub 88 also contains a central depressed area 94 for receiving a corresponding projection portion of the upper disc 84, which will be discussed subsequently, and a small projection 95 at the center of the hub for projection into the corresponding recess 75 (See FIG. 7) located centrally on the underside of the pivot button member 70.

The upper disc 84 also has a depressed area 97, formed by the projecting portion of the upper disc 84 that fits into area 94 of the hub 88, and several openings 98 for receiving the corresponding posts 90 therethrough and a central opening 99 for receiving the small projection 95 therethrough.

As can be seen from FIGS. 7 through 9, to assemble the pivot button member 70 into the tape reel 82 according to the preferred embodiment of the invention, the lower disc 86 (not shown) is first secured to the hub 88, and then the openings 98 in the upper disc 84 are placed over the lipped-posts 90 to rest the upper disc 84 on the hub 88. Then, the flat base 74 with the receses 76 is placed on the depressed area 97 between posts 90 to rest recess 75 of the flat base 74 upon the small projection 95. Then the pivot button member is twisted about 60 degrees so that the portion of the upper surface 78 of the pivot button member 70 between recesses 76 are located underneath the lips 92. Concurrently, the nodules 79 are moved along the bottom of the lips 92 until they engage the recesses 93 located in the underside of the lips 92. This "locking" engagement ensures that the pivot button member 70, once it is in place, will not unintentionally move out of place.

The pivot button member 70 has a diameter smaller than that of the hub 88 and has a wall thickness substantially equal to the wall thickness of the upper disc 84, upon which the pivot button member 70 rests. Thus, upon insertion, the upper surface of the upper disc 84 is substantially flush with the upper surface of the pivot button member 70 when the pivot button member 70 is mounted.

It can be seen that with the embodiments of the present invention, if, after insertion of the pivot button member, a molding imperfection is detected in either the tape reel components or the pivot button member, the pivot button member may be removed easily to allow for disassembly and correction of the imperfection. For example, if the upper disc is separated for replacement or repair, the pivot button member can be retained for future use.

Also, as seen from the embodiments described above, this invention provides a relatively simple design wherein only the small pivot button member is made of the expensive resin possessing high wear resistance, but the two discs and the hub which account for the greater part of the whole volume of the tape reel can be made of an inexpensive material. Thus, the tape reel of this invention enjoys both the advantages of economical production and facilitated assembly and disassembly.

The above described cassette hub assembly has been shown to be of the type intended for use in video tape recorders. However, the invention can be similarly applied to tape cassettes for use in audio or other recording and/or reproducing apparatus.

The foregoing is considered as illustrative only of the principles of the invention. Further, since numerous modifications and changes will readily occur to those skilled in the art, it is not desired to limit the invention to the exact construction and operation of the embodiments shown and described. Accordingly, all suitable modifications and variations falling within the scope of the appended claims and their equivalents are intended.

We claim:

1. A tape reel for a video or audio tape cassette, comprising:
    (a) first and second substantially flat discs, the second flat disc having at least one first opening located radially therein, and a second opening located centrally in the second disc;
    (b) a hub having a first end connected to the first flat disc and a second end connected to the second flat disc, the second end having at least one first projection located radially thereon for passing through the at least one first opening located in the second disc, and a second projection located centrally on the second end; and
    (c) a pivot button member having a substantially flat base with at least one substantially flat extension projecting radially therefrom and a recess located centrally in the lower surface of the base for receiving the second projection of the hub, and a first projection located centrally on the top surface of the base, the pivot button member being inserted through the second opening in the second disc and twisted such that the top surface of the at least one base extension rests substantially flatly against the bottom surface of the second disc, and the bottom surface of the at least one extension rests substantially flatly against the second end of the hub.

2. The tape reel of claim 1, further comprising: a recess located in the outer edge of the at least one base extension of the pivot button member, and a third projection located radially on the second end of the hub, wherein when the pivot button member is inserted on the second end of the hub, the base extension recess engagingly receives the third hub projection.

3. A tape reel according to claim 1, wherein the second disc has at least one flange extending radially into the second opening of the second disc such that when the pivot button member is inserted in the second opening and twisted the at least one base extension is located underneath the at least one flange.

4. A tape reel according to claim 1, wherein the at least one first hub projection is a weld lug inserted through the at least one first opening in the second disc, and wherein the top of said weld lug is heat-treated such that the diameter of the top is greater than the diameter of the at least one first opening in the second disc.

5. A tape reel according to claims 1, 2 or 4, wherein the at least one first hub projection comprises a plurality of weld lugs, and the at least one first opening in the second disc comprises a plurality of weld lug openings, and wherein one of the weld lugs and the corresponding weld lug opening are larger than the other weld lugs and corresponding weld lug openings for ensuring that the upper disc is aligned properly on the hub by inserting the large weld lug into the corresponding larger weld lug opening.

6. A tape reel according to claim 2, wherein the second disc has at least one flange extending radially into the second opening of the second disc such that when the pivot button member is inserted in the second opening and twisted the at least one base extension is located underneath the at least one flange.

7. A tape reel according to claims 3 or 6, wherein the at least one flat base extension comprises three extensions and the at least one second disc flange comprises three flanges, the pivot button member being inserted in the second opening of the second disc and twisted approximately 60 degrees for locating the three flat base extensions underneath the corresponding three flanges.

8. A tape reel according to claim 1, wherein the first disc is integrally formed with the first end of the hub.

9. A tape reel according to claim 1, wherein the pivot button member is molded of a wear-resistant resin.

10. A tape reel according to claim 9, wherein the wear-resistant resin is polyacetal. flanges.

11. A tape reel for a video or audio tape cassette, comprising:
    (a) first and second substantially flat discs, the second disc having at least one first opening located radially therein and a second opening located centrally in the second disc;

(b) a hub having a first end connected to the first flat disc and a second end connected to the second flat disc, the second end having at least one first projection located radially thereon for passing through the at least one first opening located in the second disc, and a lip on the end of the at least one first projection, and a second projection located centrally on the second end for passing through the second opening in the second disc; and (c) a pivot button member having a substantially flat base with at least one first recess formed in the base's outer edge and a second recess formed centrally in the lower surface for receiving the second hub projection, and a first projection located centrally on the upper surface of the base, the pivot button member being positioned onto the second disc such that the at least one first hub projection passes through the at least one first recess and the button being twisted to cause the top surface of the pivot button member to rest under the lip on the hub projection.

12. The tape reel of claim 11, further comprising: at least one second projection located on the upper surface of the pivot button member, and at least one recess located on the underside of the lip of the hub projection, wherein when the pivot button member is positioned onto the second disc and twisted, the at least one recess on the lip engagingly receives the at least one second projection.

13. The tape reel of claim 12, wherein the second disc has a central depressed area for receiving the pivot button member, the depressed area having a depth substantially equal to the thickness of the base of the pivot button member for rendering the upper surfaces of the second disc and the pivot button member substantially coplanar when assembled.

14. A tape reel according to claims 11 or 12, wherein at least one first hub projection comprises three lipped-posts, and at least one first opening in the second disc comprises three openings for receiving therethrough the lipped-posts, and wherein one of the lipped-posts and the corresponding lipped-post opening are larger than the other two lipped-posts and corresponding two lipped-post openings for ensuring that the second disc is aligned properly on the hub by inserting the larger lipped-post into the corresponding larger lipped-post opening.

15. The tape reel of claim 14, wherein the at least one recess located on the underside of the lip comprises three recesses formed in the three corresponding lipped-posts and the at least one second projection located on the upper surface of the button member comprises three projections for engaging the corresponding three lip recesses when the pivot button member is twisted.

16. A tape reel according to claims 1, 2, 3, 4, 11, 12 or 13, wherein the pivot button member once assembled in the tape reel may be removed therefrom.

17. A pivot button member for insertion and locking engagement into a tape reel assembly having a hub and a flat disc connected to opposite ends of the hub, comprising:

(a) the hub having a radial projection on an end thereof; and (b) a base having at least one substantially flat extension projecting radially therefrom, the extension having a recess formed in its outer edge thereof and, a small, integrally formed protuberance on the upper surface of the base, wherein upon insertion of said base into said tape reel assembly said recess engagingly receives said radial projection.

18. A pivot button member for insertion and locking engagement into a tape reel assembly having a hub and flat discs connected to opposite ends of the hub, comprising:

(a) the hub including a post with a lip; and (b) a substantially flat planar base having at least one recess formed in the outer edge of the base and, a small, integrally formed protuberance on the upper surface of the base, wherein said post with a lip receives the top surface of the base underneath the lip when the pivot button member is twisted.

19. The pivot button member of claim 17 or 18, wherein the pivot button is made of a wear-resistant resin.

20. The pivot button member of claim 19, wherein the wear-resistant resin is polyacetal.

* * * * *